United States Patent
Baeuerle

(10) Patent No.: US 8,347,625 B2
(45) Date of Patent: Jan. 8, 2013

(54) METHOD AND DEVICE FOR OPERATING A WASTEGATE ACTUATOR FOR A WASTEGATE

(75) Inventor: Michael Baeuerle, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 12/804,672

(22) Filed: Jul. 26, 2010

(65) Prior Publication Data

US 2011/0023481 A1    Feb. 3, 2011

(30) Foreign Application Priority Data

Jul. 30, 2009   (DE) .......................... 10 2009 028 117

(51) Int. Cl.
*F02D 23/00*    (2006.01)

(52) U.S. Cl. ............................. 60/602; 60/605.2; 60/324

(58) Field of Classification Search .................... 60/602, 60/605.2, 324
See application file for complete search history.

(56) References Cited

U.S. PATENT DOCUMENTS 7,848,910 B2 * 12/2010 Schantl et al. .................... 703/6

* cited by examiner

*Primary Examiner* — Ching Chang
(74) *Attorney, Agent, or Firm* — Kenyon & Kenyon LLP

(57) ABSTRACT

In a method for operating an actuator for a wastegate actuating device of an exhaust gas turbocharger, a wastegate situated in an exhaust branch of an internal combustion engine is electrically adjustable with the aid of the actuator, and an exhaust gas quantity flowing through the exhaust gas turbocharger is adjustable as a function of an opening position of the wastegate. The actuator is controlled using an applied electrical power in a closed position of the wastegate to provide a varying closing pressure of the wastegate as a function of a characteristic curve of an exhaust gas counterpressure applied via the wastegate.

8 Claims, 3 Drawing Sheets

METHOD AND DEVICE FOR OPERATING A WASTEGATE ACTUATOR FOR A WASTEGATE

BACKGROUND OF THE INVENTION

1. Field of the Invention

The present invention relates to engine systems having supercharged internal combustion engines having a turbine in the exhaust branch, and relates in particular to a method and a device for operating a wastegate actuator for a wastegate for controlling the exhaust gas enthalpy taken up by the turbine.

2. Description of Related Art

Various systems are known in the related art for controlling or actuating a wastegate on an exhaust gas turbocharger (TC). The wastegate corresponds to a bypass valve in a bypass line bypassing a turbine of the exhaust gas turbocharger. The wastegate is used to convert the exhaust gas enthalpy into a torque of a turbine wheel of the exhaust gas turbocharger and to use the torque to drive a compressor, which provides compressed charge air for an internal combustion engine.

In addition to the conventional pneumatic systems, electric actuators for wastegates, such as e.g. linear actuators, are currently being developed, which are able to provide considerably greater actuating forces. Such linear actuators are connected to a linkage or gearing run out of a housing and are able to displace a cup-type tappet, which opens or closes the wastegate. In such actuators, the forces for holding the open position of the wastegate may reach values in the linkage of up to approximately 250 N. These forces must be provided permanently so as to hold the wastegate e.g. reliably in the closed position such that the wastegate remains sealed.

The electric actuators in the related art have the disadvantage that for the permanent provision of the required closing force of the wastegate they have a high current or energy requirement, which results in a considerable heat loss. Due to the permanent load of a high closing force in the closed state of the wastegate, such actuators have large dimensions and thus also require a large installation space.

It is therefore an objective of the present invention to provide a method, a device and a wastegate actuating system, by which an electrically controlled actuator for a wastegate may be operated in an improved manner, in particular in a more energy-efficient manner. It is furthermore an objective of the present invention to provide an option, in which a higher actuating force is provided at the same power loss as in the related art.

BRIEF SUMMARY OF THE INVENTION

According to a first aspect of the present invention, a method is provided for operating an actuator for a wastegate actuating device of an exhaust gas turbocharger, the wastegate being electrically adjustable with the aid of the actuator and being situated in an exhaust branch of an internal combustion engine, an exhaust gas quantity flowing through the exhaust gas turbocharger being adjustable as a function of the opening position of the wastegate, the actuator being controlled using an electrical power in a closed position of the wastegate so as to provide a varying closing pressure of the wastegate as a function of a characteristic curve of an exhaust gas counterpressure applied via the wastegate.

In this manner, the electrical power may be supplied to the actuator advantageously as a function of the actual closing force requirement for maintaining a closed position of the wastegate and thus the power loss may be reduced. Furthermore, at the same power loss as in the related art, the closing force may be increased at times of increased closing force requirement.

According to one example embodiment, the electrical power of the actuator may be adjusted to provide a current closing pressure of the wastegate that is greater than the current exhaust gas counterpressure in particular by an absolute or a relative amount.

Furthermore, the electrical power of the actuator may be adjusted so as to provide a closing pressure of the wastegate, the time characteristic of which leads the characteristic curve of the exhaust gas counterpressure.

There may be a provision for the actuator to be controlled by an electrical power that produces a closing pressure that in its time characteristic is essentially proportional and/or proportional in a time-staggered manner to the exhaust gas counterpressure.

Furthermore, the actuator may be controlled using the electrical power by applying an electric current.

Using the electrical power, the actuator may be controlled as a function of a crankshaft position of a crankshaft of the internal combustion engine associated with the exhaust gas turbocharger.

According to another aspect of the present invention, a device is provided for operating an actuator for a wastegate actuating device of an exhaust gas turbocharger, the wastegate being electrically adjustable with the aid of the actuator and being situated in an exhaust branch of an internal combustion engine, the device being developed so as to adjust an exhaust gas quantity flowing through the exhaust gas turbocharger as a function of an opening position of the wastegate, and in order to control the actuator using an electrical power in a closed position of the wastegate so as to provide a varying closing pressure of the wastegate as a function of a characteristic curve of an exhaust gas counterpressure applied via the wastegate.

According to another aspect of the present invention, a wastegate actuating system is provided for controlling a wastegate. The wastegate actuating system includes the wastegate for adjusting an exhaust gas quantity flowing though an exhaust gas turbocharger and an electrically controllable actuator in a wastegate actuating device of the exhaust gas turbocharger for controlling the wastegate, the wastegate actuating system being developed to control the actuator using an electrical power such that an opening position of the wastegate and thereby an exhaust gas quantity flowing through the exhaust gas turbocharger is adjustable, the wastegate actuating system being furthermore developed to control the actuator using an electrical power in a closed position of the wastegate so as to provide a varying closing pressure of the wastegate as a function of a characteristic curve of an exhaust gas counterpressure applied via the wastegate.

DETAILED DESCRIPTION OF THE INVENTION

Figure 1:
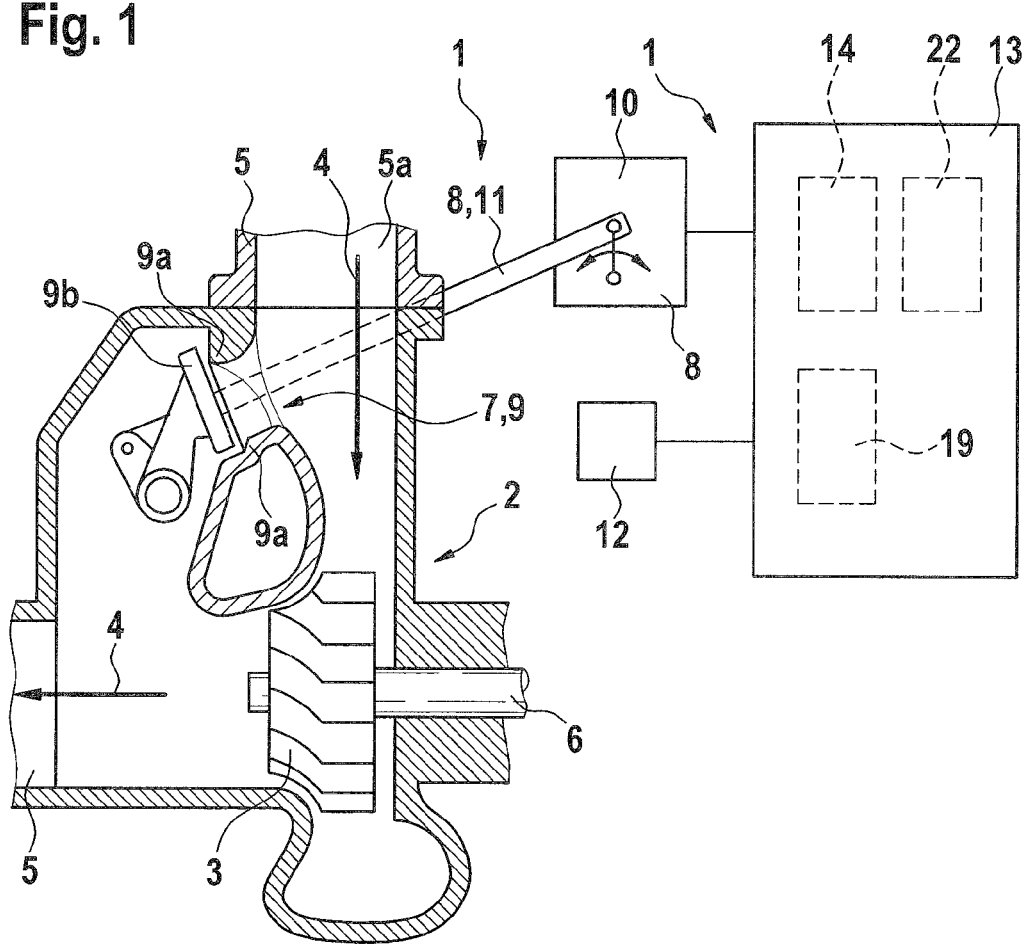
FIG. 1 shows an example embodiment of a wastegate actuating system.

FIG. 1 shows in exemplary fashion a wastegate actuating system 1 according to the present invention, which is used in an exhaust gas turbocharger 2 of an internal combustion engine (not shown). Exhaust gas turbocharger 2 is known in the related art and preferably has a turbine wheel 3, which is situated in an exhaust gas flow 4 in an exhaust branch 5 leading away from the combustion chamber of the internal combustion engine. Such exhaust gases 4 discharged by an internal combustion engine may subsequently be supplied to a catalytic converter or an exhaust system for example.

The internal combustion engine may be a diesel engine or a spark-ignition engine for example, e.g. in a motor vehicle such as a passenger car or a commercial vehicle, in a ship, an airplane, a motorcycle etc. The present invention is in principle usable in combination with any cyclically operated internal combustion engine.

Turbine wheel 3 is driven by exhaust gas flow 4 from the combustion chamber of the internal combustion engine. The torque received by the turbine wheel depends on the exhaust gas enthalpy of the exhaust gas flow. Turbine wheel 3 is connected via a shaft 5 to a compressor wheel, which is situated in a known manner in an induction tract for compressing the air (charge air) to be supplied to the internal combustion engine (not shown) and thus ensures a necessary charging pressure. With increasing speed of the internal combustion engine, the exhaust gas enthalpy of exhaust gas flow 4 rises and turbine wheel 3 receives increased mechanical power. Turbine wheel 3 drives the compressor wheel via shaft 6. The compressor wheel compresses the charge air to be supplied to the internal combustion engine. In order to limit the charging on the part of the exhaust gas turbocharger or the power output of the internal combustion engine, and thus to prevent e.g. the latter from being overstressed, the exhaust gas turbocharger normally has a charging pressure control.

According to the present invention, the charging pressure control may be implemented by a bypass valve or with the aid of a so-called wastegate 7. Wastegate 7 is controlled via a wastegate actuating device 8. Wastegate 7 is situated in a bypass line bypassing turbine wheel 3 and, if required, is used to conduct a portion of the exhaust gas supplied to exhaust gas turbocharger 2 on the input side (reference symbol 5a) past turbine wheel 3 or exhaust gas turbocharger 2 so as to conduct a portion of the exhaust gas energy past the exhaust gas turbocharger. This makes it possible to prevent a further rise of the turbine wheel speed of turbine wheel 3. To achieve this, wastegate 7 must be opened or brought into an open position. Consequently, when opening wastegate 7, a smaller portion of exhaust gas flow 4 through exhaust branch 5 is applied to exhaust gas turbocharger 2 than in a closed position of wastegate 7.

In the closed position of wastegate 7, i.e., when the bypass valve is fully closed, the exhaust gases of exhaust gas flow 4 are conducted entirely through turbine wheel 3. The pressure drop across the exhaust gas turbocharger is then at its highest point and wastegate 7 must be kept closed against the exhaust gas counterpressure of exhaust gas flow 4 or must be kept in the closed position. For this purpose, wastegate 7 or wastegate actuating device 8 are preferably constructed in such a way that the open position of wastegate 7 is ensured in the event of a failure of an associated control or of individual actuating elements, e.g. of actuating device 8. In the event of such a failure, the charging pressure consequently cannot be built up, which reduces the power provided by the internal combustion engine. That is to say, the closed position may only be assumed if actuating energy is supplied to wastegate 7, e.g., by wastegate actuating device 8.

Wastegate 7 may be developed in the form of a flat-seat valve 9 having a valve seat 9a and a closing element 9b, which is actuated via the connected wastegate actuating device 8, that is, is moved between the open position and the closed position. Also conceivable is a conical valve, an electrically actuated diaphragm or other valve solutions that can be actuated via an electrically controlled wastegate actuating device 8. Wastegate 7 may be situated in exhaust gas turbocharger 2 for example, but in another specific embodiment may also be situated in exhaust branch 5 (of the internal combustion engine) outside of exhaust gas turbocharger 2.

Wastegate actuating device 8, which is electrically controlled or supplied with electrical power by the application of an electrical variable, is preferably developed in the form of an electric actuator 10 having associated gearing, linkage or other transmission elements 11, which extend into or out of valve seat 9a when the wastegate actuating device, for example closing element 9b, is controlled and actuated. For this purpose, actuator 10 may include e.g. a rotary electric motor, a linear motor or the like.

Wastegate actuating device 8, which has an actuator 10 and transmission elements 11 for actuating wastegate 7, is a component of wastegate actuating system 1. Wastegate actuating system 1 further includes a sensor 12, e.g., on the compressor side of the exhaust gas turbocharger 2 (i.e., in the induction tract) of the internal combustion engine. Sensor 12 detects a current charging pressure (pressure of the compressed, inducted air in the induction tract). When a setpoint charging pressure is reached, sensor 12 generates a corresponding signal. The signal has the effect of opening wastegate 7 entirely or partially and of maintaining this position until sensor 12 no longer provides a signal. Sensor 12 may thereby be developed as a pressure guard.

However, the time of opening or closing wastegate 7 may be mapped in an engine control or an engine control unit 13, which renders a sensor 12 superfluous. Engine control unit 13 is to this extent to be regarded as a component of wastegate actuating system 1.

If wastegate actuating device 8 is electrically controlled, e.g., in response to a signal from sensor 12 or starting from engine control unit 13, wastegate actuating device 8 moves wastegate 7 for example into the open position, e.g., by actuating actuator 10 with the associated transmission elements 11. A portion of the exhaust gas flow is now conducted through open wastegate 7 around turbine wheel 3.

Particularly in the event of low engine speeds it is now desirable for wastegate 7 to be closed such that the entire exhaust gas flow 4 drives turbine wheel 3. In this case, a signal for assuming the open position does not exist for example.

In order to control wastegate 7 electrically such that it is closed or is kept in the closed position, wastegate actuating device 8 is controlled electrically, i.e. an electrical power is supplied to wastegate actuating device 8 by applying an electrical variable. This may be provided for with the aid of a current controller 14 for example, which is situated in engine control unit 13. Engine control unit 13 provides controlling and regulating functions for the internal combustion engine and is likewise a component of wastegate actuating system 1.

There is now a provision for the electrical power for controlling wastegate actuating device 8 to be adjusted in such a way that the closed position of wastegate 7, i.e., the completely closed position of wastegate 7, is maintained. The adjustment may be performed in such a way that the current or the electrical power supplied to actuator 10 is adjusted as a function of the exhaust gas counterpressure, which corresponds to the pressure of exhaust gas flow 4 against the closed wastegate 7, such that a continuous maintenance of the closed position of wastegate 7 is ensured at a reduced energy requirement.

The electrical power applied on wastegate actuating device 8 for maintaining the closed position is supplied to wastegate actuating device 8 or to actuator 10 in such a way that at a higher exhaust gas counterpressure on wastegate 7 the power applied on wastegate actuating device 8 is greater than at a lower exhaust gas counterpressure. When operating the internal combustion engine, the exhaust gas counterpressure on wastegate 7 fluctuates due to the cyclical operation of the internal combustion engine. Wastegate actuating device 8 is controlled in such a way that the time characteristic of the control power or of the controlling electrical variable fluctuates in synchronicity with the exhaust gas counterpressure. In controlling wastegate actuating device 8, however, a small offset in time between the application of the controlling electrical variable and the exhaust gas counterpressure may be required in order to take into account e.g., possible inductivities in actuator 10. Minimum values and maximum values in the respective characteristic curve are reached at approximately the same time or at the same time. The energy supplied in the closed position varies as a function of the exhaust gas counterpressure.

Since the timing of the internal combustion engine is firmly coupled to an angular position of the crankshaft (if the internal combustion engine has a crankshaft), the time characteristic of the exhaust gas counterpressure in the closed position of wastegate 7 depends on a crankshaft position (crank angle) and the engine speed. The exhaust gas counterpressure and consequently the closing force requirement for maintaining the closed position of wastegate 7 change depending on the crankshaft position (the exhaust gas counterpressure curve is usually periodic as a function of the crankshaft angle of rotation). The closing force requirement corresponds to the actuating force to be generated for ensuring a sufficient tightness of wastegate 7. To this extent, the characteristic curves of the exhaust gas counterpressure or the underlying crankshaft position and the control of the actuator in the closed position are synchronized.

Figure 2:
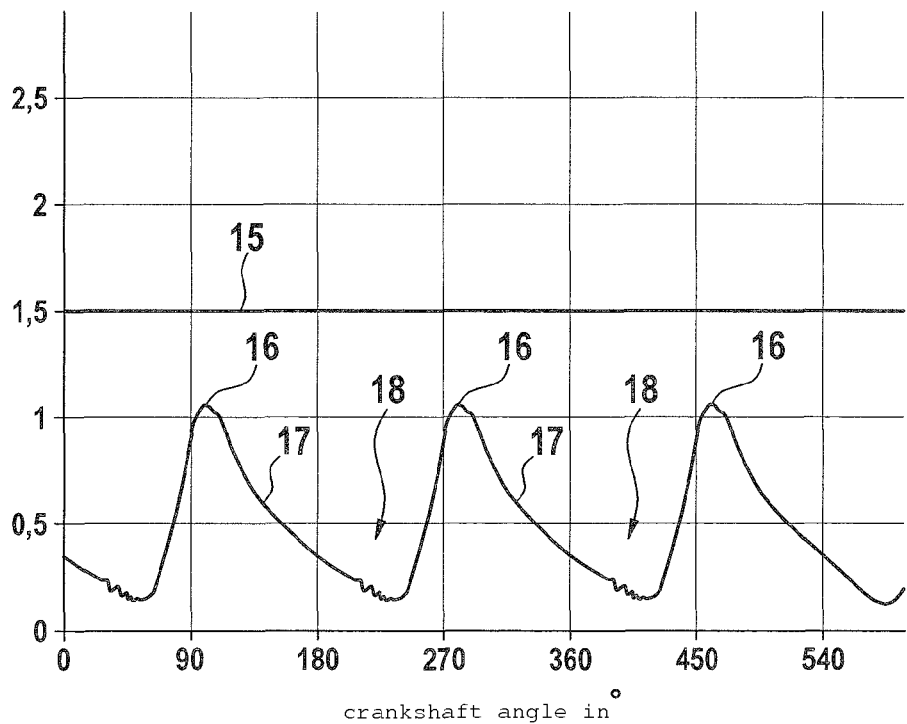
FIG. 2 shows a diagram for illustrating the characteristic curve of the closing pressure of the wastegate and of the exhaust gas counterpressure at a constant supply of power to the wastegate actuator.

FIG. 2 shows a periodic characteristic curve of the exhaust gas counterpressure and a constant characteristic curve of the closing pressure of a wastegate actuating device 8 according to the related art controlled by constant power, where the closing pressure corresponds to the maximum pressure that does not result in opening wastegate 7. By controlling wastegate actuating device 8 in the manner described above, the electrical energy effectively required for maintaining the closed position of wastegate 7 is considerably reduced compared to a conventional uniform control 15, which does not take into account pressure fluctuations of the exhaust gas counterpressure. Nevertheless, according to the present invention, the required closing force is provided at the respectively required time. At an identical power loss, the actuating force alternatively may be increased considerably if the power not required in contrast with constant power supply 15 is distributed to the pressure peaks 16 in exhaust gas flow 4.

In order to achieve a control of wastegate actuating device 8, as needed, in the closed position in accordance with the present invention, it is advantageous to ascertain in advance the electrical power required for maintaining the closed position of wastegate 7, which varies as a result of pressure peaks 16 in exhaust gas flow 4 upstream of wastegate 7, in particular due to different crankshaft positions. The maximum closing force is for example only required for distinct pressure peaks 16, while in interim phases 18, which have in part a considerably reduced exhaust gas counterpressure, a markedly lower closing force suffices.

In order to provide the power to be supplied to actuator 10 as needed, wastegate actuating system 1 may ascertain the required power. For this purpose, it is possible to use, for example, the characteristic curve of the exhaust gas counterpressure (upstream from wastegate 7) over a crankshaft angle of rotation (of the internal combustion engine) at different engine speeds, the closing force requirement of wastegate 7 for maintaining the closed position as a function of the exhaust gas counterpressure, and the electrical current requirement for wastegate actuating device 8 (as a function of the closing force to be applied). The characteristic curve of exhaust gas counterpressure 17 over the crankshaft angle of rotation (at the respective speed of the internal combustion engine) is usually known in the related art and is mapped, e.g., in engine control unit 13 accordingly by characteristics maps or functions. The closing force requirement of wastegate 7 for providing the closing pressure or for maintaining the closed position may be ascertained in a stationary manner, e.g., on a hot gas test stand, as a function of the exhaust gas counterpressure, e.g., by measurement, and programmed into the respective characteristics maps or functions. The control power for wastegate actuating device 8, in particular for actuator 10, for providing a closing force is known, e.g., in an actuator-specific manner (specification sheet) or is ascertainable, e.g., by measurement.

Based on these variables, it is possible, possibly with a necessary lead, to calculate and output the current or energy requirement for maintaining the closed position of wastegate 7, e.g., in a crankshaft-synchronized manner (as a function of the engine speed). A calculating unit 19 of engine control unit 13 or, e.g., a computer, may be used for the calculation.

Figure 3:
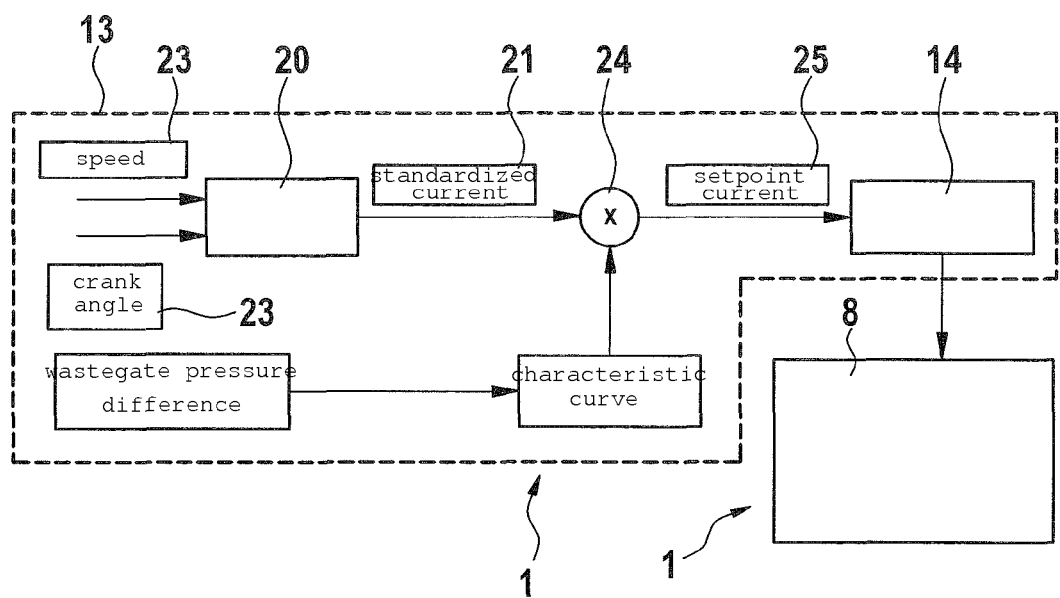
FIG. 3 shows a schematic block diagram for illustrating a structure of a wastegate actuating system.

In a simplified example embodiment of wastegate actuating system 1, which is schematically represented in FIG. 3, a standardized setpoint current 21 may be ascertained with the aid of a characteristics map 20 as a setpoint variable for the current regulation as a function of the engine speed and the crankshaft position. Characteristics map 20 is stored, e.g., in a memory unit 22 of engine control unit 13. With the aid of characteristics map 20 and provided or measured operating state values 23 of the internal combustion engine (speed, crankshaft angle of rotation) it is possible to ascertain a standardized setpoint current 21 that is a function of the crankshaft position. Setpoint current 21 corresponds to the electrical power to be provided to wastegate actuating device 8.

This ascertained standardized setpoint current 21 may be subsequently multiplied by a pressure difference-dependent factor (reference symbol 24) and transmitted as setpoint current specification 25 to current controller 14 e.g. of engine control unit 13.

For ascertaining the pressure difference-dependent and preferably crankshaft position-independent factor, the effective average differential pressure on wastegate 7 is used for example (the pressure difference between the inlet side of wastegate 7 and the outlet side). The pressure difference is modeled from different engine operating state variables such as, e.g., the load, exhaust gas temperature, ambient pressure in the combustion chamber, speed, etc. With the aid of a characteristic curve that is likewise stored in engine control unit 13 it is possible to ascertain the applicable factor from the engine operating state variables.

This applicable pressure difference-dependent factor ascertained from operating parameters and the characteristic curve is multiplied, e.g., with standardized setpoint current 21 in a multiplier 24 such that a setpoint current 25 is obtained as a setpoint for current controller 14, which corresponds to exhaust gas counterpressure curve 17.

Figure 4:
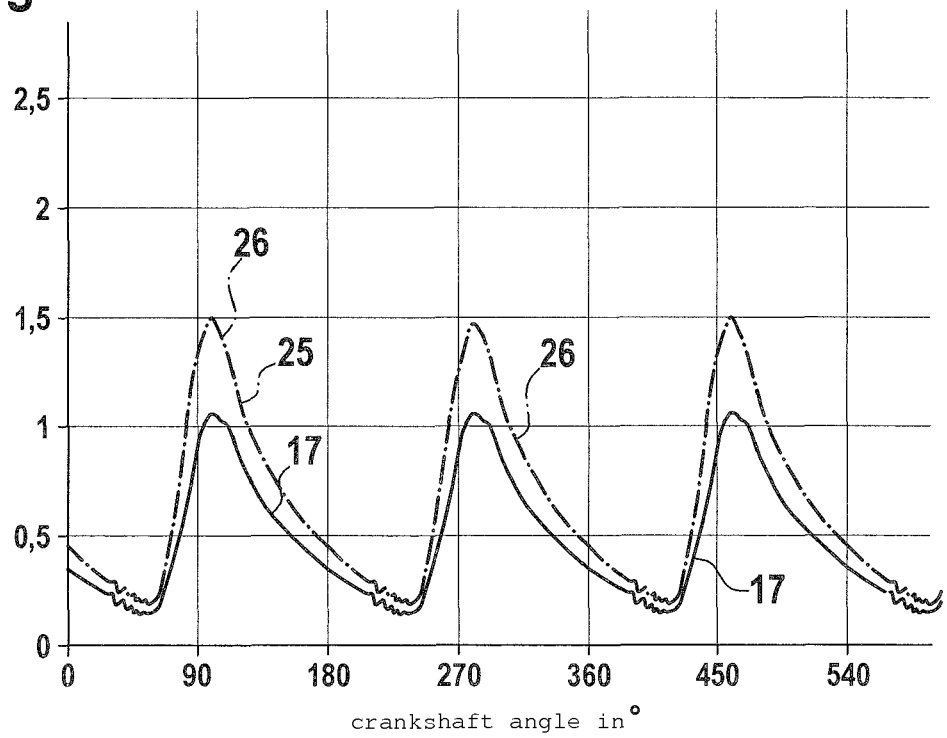
FIG. 4 shows a diagram for illustrating the characteristic curve of the closing pressure of the wastegate and of the exhaust gas counterpressure at a current-minimized supply of power to the wastegate actuator.

FIG. 4 shows the periodic characteristic curve of the exhaust gas counterpressure and the characteristic curve of the closing pressure achieved by the control with setpoint current 25, the closing pressure corresponding to the maximum pressure that does not result in opening the wastegate. It can be seen that the closing pressure is adapted to the exhaust gas counterpressure and runs mostly proportional, e.g., proportional in a slightly time-staggered manner, with respect to the latter. At any point in time, the closing pressure is greater than the exhaust gas counterpressure. In particular, the closing pressure is selected in such a way that it is above the respective exhaust gas counterpressure by an absolute or relative amount. A necessary time offset may result, e.g., as a consequence of a response time of actuator 10, which requires a lead of the control by the electrical variable with respect to the characteristic curve of the exhaust gas counterpressure. This can be taken into account accordingly in controlling wastegate actuating device 8 or actuator 10.

Exhaust gas counterpressure 17 and the electrical power to be supplied, which is applied in the form of a control using setpoint current 25, now rise and fall in the time characteristic simultaneously or correspondingly form maximum and minimum values. The above-described power control preferably only occurs if the closed position was detected, e.g. if no signal from sensor 12 exists. Outside of the closed position, wastegate 7 is positioned, e.g., conventionally via a position control or regulation.

Current controller 14 is preferably a component of the engine control or an engine control unit 13 and is provided to control wastegate actuating device 8 or the actuator 10 contained within it in such a way that the wastegate provides the required closing pressure. In order to control wastegate actuating device 8 using a desired power or a desired current, there may be a provision for current controller 14 to adjust the desired power or the desired current by selecting a pulse control factor of a pulse width modulation, by which wastegate actuating device 8 is controlled.

Figure 5:
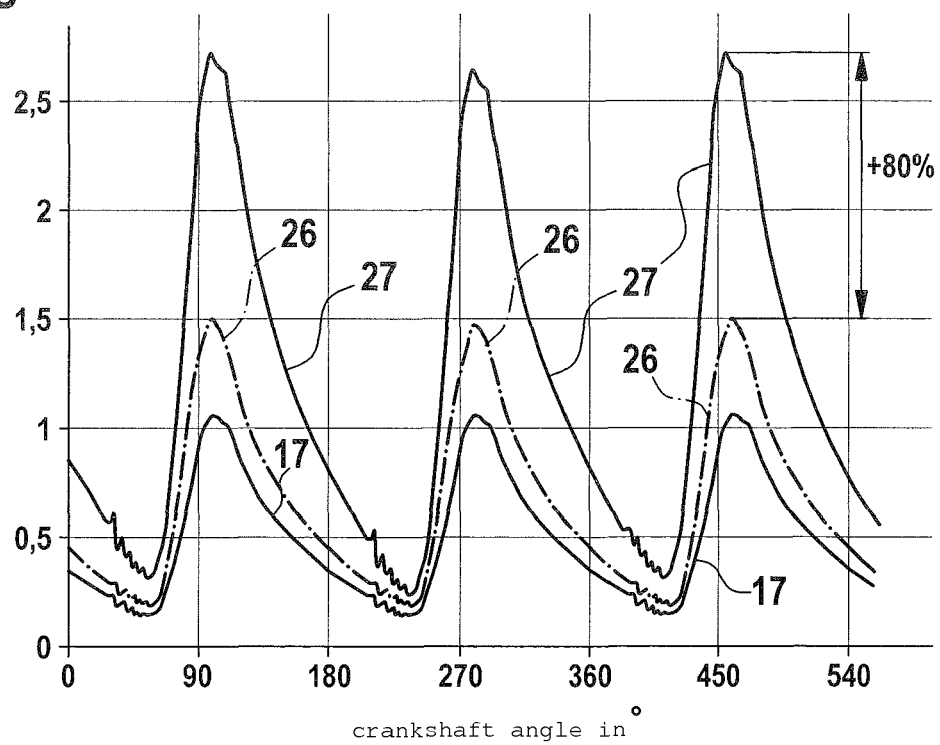
FIG. 5 shows another diagram for illustrating the characteristic curve of the closing pressure of the wastegate and of the exhaust gas counterpressure at a force-maximized supply of power to the wastegate actuator.

FIG. 5 shows an exemplary characteristic curve of the closing pressure of wastegate actuating device 8 in the case of a force-maximized supply of power 27. Assuming that the dimensioning of wastegate actuating device 8 and of wastegate 7 is unchanged with respect to the previously described system using constant power supply 15, a higher closing pressure of wastegate 7 may be achieved at an identical effective power loss with respect to the case of the constant power supply to wastegate actuating device 8. A higher closing pressure may effect an improved tightness of the wastegate, for example. Theoretically, a closing force increase of up to 80 percent is possible using identical power. In this specific embodiment, the supplied electrical power is also varied as a function of the exhaust gas counterpressure in a closed position of wastegate 7.

Both in the case of a power-minimized as well as in a closing force-maximized supply of power, the required electrical power, which is to be applied or expended in the closed position of wastegate 7 for providing the closing pressure, is ascertained by engine control unit 13.

What is claimed is:

1. A method for operating an actuator (10) for a wastegate actuating device (8) of a wastegate (7) in an exhaust gas turbocharger (2), comprising:
   electrically adjusting the wastegate with the aid of the actuator, wherein the wastegate is situated in the exhaust branch of the internal combustion engine, an exhaust gas quantity flowing through the exhaust gas turbocharger being adjusted as a function of an opening position of the wastegate; and
   controlling the actuator by an applied electrical power in a closed position of the wastegate to provide a varying closing pressure of the wastegate as a function of a characteristic curve of an exhaust gas counterpressure applied via the wastegate.

2. The method as recited in claim 1, wherein the applied electrical power of the actuator is adjusted to provide a current closing pressure of the wastegate greater than a current exhaust gas counterpressure.

3. The method as recited in claim 2, wherein the applied electrical power of the actuator is adjusted to provide a closing pressure of the wastegate, the time characteristic of the applied electrical power leading the characteristic curve of the exhaust gas counterpressure.

4. The method as recited in claim 2, wherein the applied electrical power of the actuator causes the time characteristic of a closing pressure of the wastegate to be essentially proportional to the time characteristic of the exhaust gas counterpressure.

5. The method as recited in claim 2, wherein the actuator is controlled by applying an electrical current.

6. The method as recited in claim 2, wherein the actuator is controlled by the applied electrical power as a function of a crankshaft position of a crankshaft of the internal combustion engine associated with the exhaust gas turbocharger.

7. A control system for operating an actuator for a wastegate actuating device of a wastegate in an exhaust gas turbocharger, the wastegate being electrically adjustable with the aid of the actuator and being situated in an exhaust branch of an internal combustion engine, the control system comprising:
   a control unit configured to adjust an exhaust gas quantity flowing through the exhaust gas turbocharger as a function of an opening position of the wastegate, and to control the actuator using an applied electrical power in a closed position of the wastegate to provide a varying closing pressure of the wastegate as a function of a characteristic curve of an exhaust gas counterpressure applied via the wastegate.

8. A wastegate system, comprising:
   a wastegate configured to adjust an exhaust gas quantity flowing through an exhaust gas turbocharger;
   an electrically controllable actuator in a wastegate actuating device of the exhaust gas turbocharger for controlling the wastegate;
   control unit configured to control the actuator using an applied electrical power such that an exhaust gas quantity flowing through the exhaust gas turbocharger is adjusted as a function of an opening position of the wastegate, and to control the actuator using the applied electrical power in a closed position of the wastegate to provide a varying closing pressure of the wastegate as a function of a characteristic curve of an exhaust gas counterpressure applied via the wastegate.

* * * * *